United States Patent [19]

Obrig et al.

[11] Patent Number: 4,866,642
[45] Date of Patent: Sep. 12, 1989

[54] METHOD AND APPARATUS FOR DETERMINING THE DIAMETER OF RAIL VEHICLE WHEELS

[75] Inventors: Hans W. Obrig, Essen; Helmut Wittkopp, Erkelenz; Nis-Friedrich Ewald, Moenchengladbach-Rheindahlen, all of Fed. Rep. of Germany

[73] Assignee: Wilhelm Hegenscheidt Gesellschaft GmbH, Erkelenz, Fed. Rep. of Germany

[21] Appl. No.: 72,229

[22] Filed: Jul. 10, 1987

[30] Foreign Application Priority Data

Jul. 29, 1986 [DE] Fed. Rep. of Germany ....... 3625564

[51] Int. Cl.$^4$ .............................................. G01V 9/04
[52] U.S. Cl. ...................................... 364/562; 364/560; 364/563; 356/384; 356/385; 250/560; 377/22
[58] Field of Search ................ 356/384, 385; 250/560; 364/562, 563, 560, 561; 377/24

[56] References Cited

U.S. PATENT DOCUMENTS 3,162,712  12/1964  Ingber ................................. 356/387
4,724,704  2/1988  Alain ..................................... 250/560
4,749,870  6/1988  Schmalfuss et al. ................ 356/385

FOREIGN PATENT DOCUMENTS

3432355  of 0000  Fed. Rep. of Germany .
3432361  of 0000  Fed. Rep. of Germany .
1076949  3/1960  Fed. Rep. of Germany ...... 356/387
2541019  8/1984  France ............................... 356/384

Primary Examiner—Parshotam S. Lall
Assistant Examiner—Ellis B. Ramirez
Attorney, Agent, or Firm—W. G. Fasse; D. H. Kane, Jr.

[57] ABSTRACT

The diameter of railroad wheels is calculated from data obtained by simultaneously producing two marker points on the tread surface of the wheel and simultaneously sensing these marker points and from data representing the known fixed location of the marker point generators and of the sensors. These data define a chord line and a chord height subtending the chord line. The length of the chord line and chord height in turn define the wheel diameter. A computer performs the calculations and provides a respective output that may be used for display or for controlling a tool such as a wheel truing machine.

19 Claims, 6 Drawing Sheets

METHOD AND APPARATUS FOR DETERMINING THE DIAMETER OF RAIL VEHICLE WHEELS

FIELD OF THE INVENTION

The invention relates to a method for determining the diameter of rail vehicle wheels. Each of such wheels has a circumferential surface forming the so-called tread. The invention also relates to an apparatus for performing the present method.

DESCRIPTION OF THE PRIOR ART

Methods and devices of the type mentioned above have become known from German Patent Publications (DE-OS) No. 3,432,355 and 3,432,361. These publications disclose the determination of the diameter of the wheel flange by means of light barriers arranged at a spacing from one another and in parallel to the rail surface for determining a chord length and then making conclusions from the chord length with regard to the wheel flange diameter. This prior art also suggests to determine the radial flange dimension and to then make conclusions regarding the wheel diameter in a measuring plane. Such measuring plane extends perpendicularly to the rotational axis of the respective wheel and preferably centrally through the wheel. However, it has been found that certain dimensions can be determined only rather crudely by means of light barriers parallel to the rail surface. The conclusion made on the basis of the wheel flange diameter and on the basis of the radial flange dimension for ascertaining the tread diameter in the measuring plane, contains a number of inaccuracies just as any form of indirect measurement. Diameters of a railroad wheel ascertained in this manner in the measuring plane of the wheel are not sufficiently precise for further use, for example, in a wheel truing machine.

OBJECTS OF THE INVENTION

In view of the foregoing it is the aim of the invention to achieve the following objects singly or in combination:

to replace the indirect measurement of the prior art by the direct measurement of defined characteristic values for the diameter determination, more specifically, for the calculation of the tread diameter of the wheel in the measuring plane;

to provide a method which is suitable for measuring wheels forming part of an installed wheel set moving along a rail or of a stationary wheel;

to calculate the wheel diameter repeatedly for different pairs of points on the tread surface to thereby determine irregularities in the tread surface;

to avoid that lateral displacements of the wheel relative to the rail on which the measuring takes place falsify the calculation results;

to assure accurate calculations even if the location of the wheel relative to the rail in the measuring range allows for a substantial play;

to use two laser beams as the radiation sources for the measuring;

to repeat measurements for ascertaining errors of the measuring equipment and for detecting defects in the circular shape of the tread surface;

to provide an apparatus for performing the above mentioned measurements and calculating the wheel diameter automatically, based on the results of the measurements and on information stored in a computer memory; and to determine the wheel profile and use the resulting data for the diameter calculation, especially when sensed points on the wheel tread surface are not located exactly in the so-called measuring plane.

SUMMARY OF THE INVENTION

The above objects have been achieved according to the invention by simultaneously scanning at least two random points on the circumferential surface of the wheel to be measured, whereby these points are spaced from each other in the circumferential direction. The two points are connected by a chord line and the chord height subtending the chord line is also used for calculating the wheel diameter. The simultaneous sensing of two points and their geometrical determination permits the definition of a chord line which in turn determines together with the wheel rail contact point or with the chord height the geometry of a circle on which the end points of the chord line are located, whereby the diameter of the respective wheel can be calculated. In these instances, the chord line extends in parallel to the rail surface on which the wheel rail contact point is located. The simultaneous sensing of the points assures a direct diameter determination because no time measurement is required for determining any time lapse between sequential sensing or scanning steps. Thus, any conditions that may vary due to a time lapse between sequential scannings are also avoided. As a result, any acceleration or deceleration or position variations of the wheel to be measured cannot any more falsify the calculated wheel diameter. Thus, it is important for the invention that all characteristic values defining a certain circle are ascertained simultaneously. Any variation in the position of the wheel during the simultaneous measuring of the several points, must be kept as small as possible. Ideally, the position modification of the wheel should be zero.

It is preferable that all points to be scanned are located in the so-called measuring circular plane which will be referred to as the measuring plane below. The measuring plane is a plane extending perpendicularly to the rotational axis of the wheel to be measured, and centrally through the wheel. When the points to be scanned are located in the measuring plane on the tread surface of the wheel, the required calculations are simplified and the measuring precision is increased. The measuring plane is generally that plane in which standardized diameters of railroad wheels are located.

According to the invention it is preferable that each of the two points to be scanned or sensed is located on opposite sides of an axle plane. The axle plane is defined by the rotational axis of the wheel and by the rail wheel contact point through which the axle plane extends. The axle plane extends perpendicularly to the measuring plane. By locating the points to be sensed on opposite sides of the axle plane, the measuring operation itself is simplified as well as the subsequent calculation. Additionally, this location of the points to be sensed makes it possible to automatically ascertain the location of a wheel to be measured relative to the measuring devices, prior to simultaneously sensing all necessary points.

In a simplified embodiment of the invention one of the two points to be scanned is the wheel rail contact point. If the two points one on the wheel and the other on the rail and wheel, are known with regard to their relative position to each other, a definite circle is defined by these two points because the chord line between the two points constitutes the base of an isosceles triangle, the sides of which correspond to the radius of the circle. The median perpendicular line to the base of said triangle or to the chord line, divides the angle between the isosceles sides of the triangle. The resulting half angle is actually known because of the known position of the second sensed point which is not the wheel rail contact point. Thus, the diameter of the respective circle is geometrically defined.

The present method can also be performed by simultaneously sensing two points on the wheel tread surface, which points are located on the same side of the above mentioned axle plane. In this instance, the wheel rail contact point is also taken into account so that the diameter of the wheel in the measuring plane can again be exactly determined.

By performing the present method steps repeatedly, but separately for each calculation, it is possible to calculate several wheel diameters for determining irregularities in the shape of the tread surfaces, if desired.

It is preferable that all sensed points are located in the same plane perpendicularly to the rotational wheel axis, preferably the measuring plane, whereby the calculations for ascertaining the wheel diameter are simplified.

If desired the present method and apparatus may be combined with a wheel profile measurement to ascertain the actual or worn profile of a wheel. At least the profile of the tread surface is determined and a profile line is then intersected with the plane in which at least one of the sensed points is located for thus providing a further point at the respective intersection. This procedure is advantageous if it was not possible to locate both sensed points exactly in the measuring plane because in that instance it becomes possible to make a back calculation into the measuring plane with the aid of the profile contour. Thus, any lateral displacements of the wheel on the rail, in the axial direction of the wheel, cannot falsify the measured results.

In one embodiment of the present method two electromagnetic beams are directed onto the tread surface of a wheel rolling through a defined measuring distance along a rolling plane defined by the surface of the rail. The two electromagnetic radiation beams extend in a plane perpendicularly to the wheel axle, preferably the measuring plane, and are directed at a known angle relative to the rolling surface. The two radiation beams produce point-type reflection areas on the tread surface and these areas are suitable for evaluation. The position of the radiation sources producing the two radiation beams relative to each other is known, and the spacing between the sources is taken into account in the calculation. Additionally, the point type reflection areas are sensed by suitable sensors to provide respective data for two points which define the above mentioned chord line above the rolling plane. The respective chord height subtended below the chord is also taken into account in the diameter calculation and so is any slant in the chord line relative to the rolling plane. This type of measurement involving the known angles ($\alpha, \beta$) of the radiation beams relative to the rolling plane and using the known arrangement of the radiation sources and sensors, makes it possible to allow a substantial play for the position of the wheel in the measuring range in which the sensing is performed. Although this type of performance of the present method calls for a larger number of calculations, the relative independence of the wheel position within the measuring range has its advantages, for example, to the extent that the measuring operation may be started manually. This method assures an exact determination of the points necessary for the diameter calculation while simultaneously permitting a certain lee-way in the positioning of the radiation sources and sensors within the measuring range. The point-type reflection areas produced by the radiation beams should be as small as possible so that the measuring precision may be as large as possible. However, the point-type reflection areas must be large enough to reflect an energy quantity that is sufficient to be sensed. A certain beam diameter and hence diameter of the point type reflection areas, is also necessary to make sure that the beam is not reflected in unexpected directions. A beam of very small diameter could be reflected in unexpected directions by the microstructure of the tread surface. A compromise must be made between the requirement that the reflection surface should be as small as possible and that sufficient energy must be reflected for a measurement. Thus, it is possible to use a larger reflection area and then evaluate only the center of that reflection area in the receiver. Such center evaluation may be limited to a determined reflection area diameter which may be given, for example, by proper masking.

According to the invention it is possible that the wheel moves through the measuring range along the rolling surface or plane. It is not necessary to stop the wheel for the measuring. However, it is not necessary that the wheel moves. It is also possible that the measuring equipment may be moved relative to the wheel. In both instances the present method can be performed.

The present method is preferably performed by directing two laser radiation beams onto the tread surface. Such beams can be easily controlled for forming a sufficiently small point-type reflection surface or area while simultaneously providing sufficient energy to be sensed by precisely controllable optical means such as charge coupled devices. Cameras employing such charge coupled devices are known in the art and are capable of determining the position of a light point if the position of the camera itself is known.

According to a further modification of the invention the simultaneous scanning of two points in one position of the wheel within the measuring range is repeated in another position of the wheel in the same measuring range so that any errors in the apparatus itself and also faults in the tread surface configuration can be ascertained and, if necessary, eliminated or their effects at least minimized by obtaining mean values from several measurements.

The apparatus for performing the present method is located alongside a rail section defining a measuring range of given length and providing a running or rolling surface for the wheel to be measured. The apparatus comprises at least two marking devices for producing at least two sensible point-type markers on the tread surface of the wheel. It is sufficient that the point-type markers are present on the wheel surface at the time when they are sensed. At least two sensors are located for sensing the two markers. The apparatus also comprises a central processing computer connected to the sensors for receiving data to be taken into account in the diameter calculation. The computer also functions as a control device and is connected with the sensors, as well as with the marking devices. The marking devices and the sensors are located in known positions relative to each other and relative to the running or rolling surface defined by the rail so that the marking and its sensing is possible within the measuring range of defined length along which the wheel rolls on the rail.

The marking devices suitable for the present purposes may, for example, comprise a single laser generator, the beam of which is split by a semipermeable mirror to produce two laser beams which are so directed that they are located in a defined position and have a known angular inclination relative to the rolling surface while the wheel passes through the measuring range. The laser beams impinge upon the tread surface at least at the points of time when the sensing takes place to produce two light points, on the surface, for example, in the measuring plane. The sensors such as cameras comprising charge coupled devices for the sensing, are located in determined positions. The central processing unit receives the data from the sensors and makes sure that the apparatus is activated when a wheel is present in the sensing or measuring range of the sensors. The computer then calculates the diameter and displays the diameter on a display device which may, for example, be a printer or the like. Instead of the display device the computer may, for example, control a machine tool to perform a truing operation on the wheel that has been measured if the measurement should indicate the necessity for such a truing operation.

Preferably, the marking devices comprise at least one laser which is precisely controllable and hardly trouble-prone so that a high functional reliability is obtained. Another advantage of using a laser marking generator is seen in that at least certain zones of the measuring range may be visually observed. Incidentally, the above mentioned charge coupled devices are especially suitable for sensing light signals including reflections caused by a laser beam impinging on the tread surface.

A profile measuring apparatus may be combined with the present apparatus for determining the wheel diameter so that the output data of both devices may be used for providing information regarding the quality of a railroad wheel.

The starting of the present apparatus may be triggered either manually by an operator, or automatically by the wheel passing over sensor switches of conventional construction so that the present system is also suitable for a fully automatic operation.

The marking generators for producing electromagnetic radiation beams or beam bundles may be located to direct the beams at the wheel with a given angle relative to the rolling surface or they may be located to direct the beam vertically upwardly. Especially in the latter instance the two generators should be spaced from each other by a given fixed spacing that is smaller than the smallest diameter of any wheel expected to be measured. Such a spacing avoids any adjustment of the spacing with regard to different wheel diameters.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
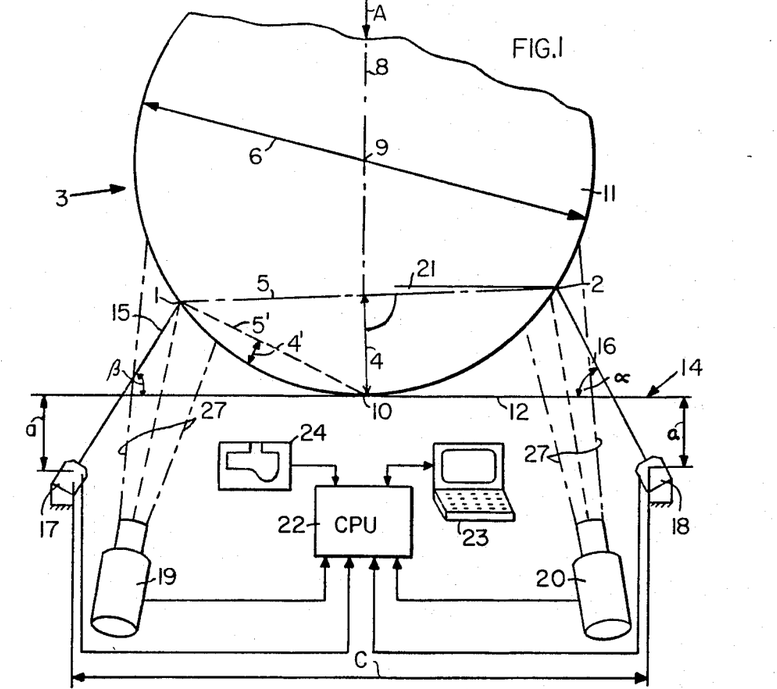
FIG. 1 is a schematic illustration of an apparatus according to the invention for performing the present method.
Figure 2:
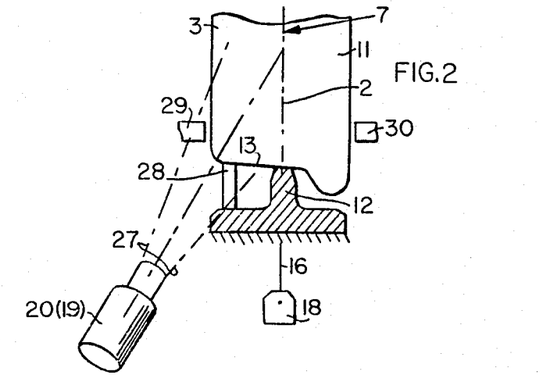
FIG. 2 is a view in the direction of the arrow A in FIG. 1.

Referring to FIGS. 1 and 2, a rail 12 defines a rolling or running surface 14 for a wheel 11, the diameter 6 of which is to be measured in accordance with the present invention. The wheel may be one wheel of a wheel set having a rotational axis 9 and rolling through the measuring station along the rolling surface 14. As shown, the wheel 11 is instantaneously in a sensing or measuring position. In this position, two measuring markers or reflecting dots or points or areas 1 and 2 are projected onto the tread surface 3 of the wheel 11 by means of two marking devices such as laser generators 17 and 18. These laser generators are located on opposite sides of a vertical axle plane 8 which passes entirely through the rotational axis 9 and through the wheel rail contact point 10. The laser generators 17 and 18 have a fixed defined spacing C from each other and the same spacing "a" from the rolling surface 14.

The laser 17 projects a laser beam 15 onto the wheel surface at an angle $\beta$ relative to the rolling surface 14 to produce the reflecting marker 1. The laser 18 projects a laser beam 16 onto the tread surface of the wheel 11 to produce the marker 2. Beam 18 extends at the angle $\alpha$ relative to the rolling surface 14. Two sensors 19 and 20 for example, in the form of cameras using charge coupled devices, are located to receive light reflected from the markers 1 and 2. Preferably, the generators 17 and 18 are located below the rail 12 in the measuring plane 7 which extends perpendicularly to the plane 8 and thus perpendicularly to the rotational axis 9 and centrally through the wheel 11. The measuring plane 7 is circular in accordance with the diameter of the wheel. The rail 12 has holes therein so that the beams 15 and 16 may pass through the respective opening for impinging on the tread surface 3. In any event, the laser generators with their fixed spacing from each other and with their fixed spacing from the rolling surface 14 and with the known angles $\alpha$ and $\beta$, provide together with the reflected light, the information necessary for the calculation of the wheel diameter 6. The cameras 19 and 20 are so located that they can receive the light reflected from the markers 1 and 2. Additionally, these cameras 19 and 20 the sensing range 27 depends on the size of the reflecting area formed by the markers 1 and 2. The cameras 19 and 20 may be located laterally on one side of the measuring plane 7 as shown in FIG. 2. In any event, the cameras 19 and 20 are also located in known, fixed positions relative to the lasers 17 and 18.

As shown in FIG. 2, the above mentioned holes in the rail 12 are bypassed by support rails 28 for the wheel 11. Additionally, lateral stops 29 and 30 are so arranged that the wheel 11 can not make undesired lateral excursions.

Referring again to FIG. 1, a central processing unit 22, such as a microprocessor of known construction, controls the operation of the present system and performs the calculation of the wheel diameter. The two lasers 17 and 18 and the cameras 19 and 20 are electrically connected to the central processing unit 22. A keyboard and display device 23 is also operatively connected to the central processing unit 22. A wheel profile measuring and ascertaining device 24 is also connected to the unit 22. The profile measuring device 24 will be described below in more detail with reference to FIG. 7. The profile measuring device 24 may be located anywhere along the rail and it is sufficient to transmit its output data to the unit 22. However, a fixed relationship of the wheel to the wheel profile measuring device 24 must be maintained and also supplied to the unit 22. Thus, it may be preferable to install the device 24 as an integral part of the unit 22, or at least close thereto.

Figure 3:
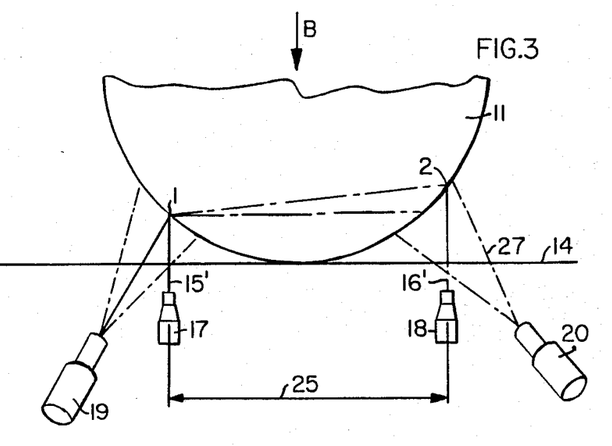
FIG. 3 is a view similar to FIG. 1, however, showing marking generators arranged for directing their marking beams vertically upwardly against a wheel.
Figure 4:
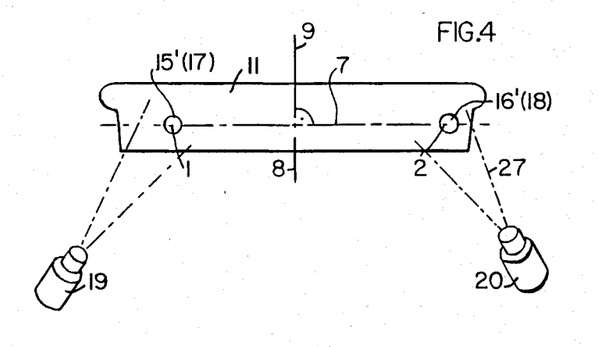
FIG. 4 is a view in the direction of the arrow B in FIG. 3.

FIGS. 3 and 4 show a modification of the apparatus according to FIG. 1, whereby the cameras or receivers 19 and 20 have the same position as shown in FIG. 2. However, the radiation sources 17, 18 are located vertically below the rolling or running surface 14 so that each of the angles α and β is a right angle. Additionally, the radiation beams or beam bundles 15' and 16' have a defined, fixed spacing 25 from each other and they extend in parallel to each other. The spacing 25 is so selected that it is smaller than the smallest diameter of any wheel to be expected to pass through the measuring range. The fixed spacing 25 simplifies the calculations. Additionally, making it smaller than the smallest expected wheel diameter avoids adjustments in the position of the radiation sources or lasers 17, 18.

Figure 5:
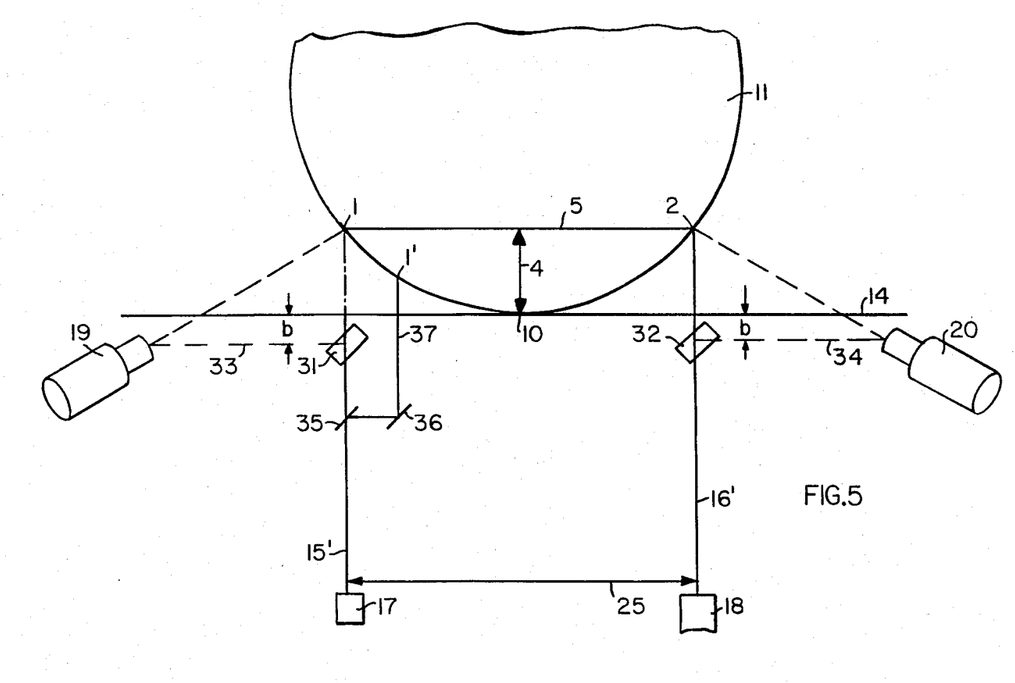
FIG. 5 is a view similar to that of FIG. 3, but showing further semipermeable mirrors for generating an additional marker on the wheel tread surface.

FIG. 5 shows a modification of the embodiment of FIGS. 3 and 4. In FIG. 5, the beam 15' from the radiation source 17 first passes through a semipermeable mirror 35 which reflects a portion of the beam onto a fully reflective mirror 36 to produce a further beam 37 for generating a reflection point or area 1'. The portion of the beam 15' passing through the mirror 35 is further reflected by a semipermeable mirror 31 to form a reference beam 33 which passes directly to the camera 19. The portion of the beam 15' passing through the semipermeable mirror 31 generates the reflecting point or area 1. Similarly, the beam 16' from the laser 18 passes through a semipermeable mirror 32 to produce a further reference beam 34 passing directly to the camera 20. The portion of the beam 16' passing through the mirror 32 generates the point or area 2. The relative position of the mirrors 31 and 32 to the rolling or running surface 14 is known, for example, in the form of a fixed spacing "b". Thus, with this known spacing b and with the aid of the reference beams 33, 34, it is possible for the unit 22 to calculate the chord height 4 subtended below the chord line 5 interconnecting the points 1 and 2. The purpose of the additional reflection point 1' is as follows: with the point 1' and the other two points 1 and 2, three points are determined whose position to each other enables the calculation of the related circle diameter. With the aid of known geometric relationships, summarized at the end of this disclosure, it is possible to calculate the length of the chord line 5 or 5' and to also calculate the respective chord height 4 or 4' subtended below the respective chord line. The length of the chord line and the chord height or the height of the mentioned points 1 and 2 enable the unit 22 to calculate the wheel diameter 6 in accordance with the program steps also set forth at the end of this disclosure.

The measuring operations may be performed as follows. The laser beams 15 and 16 may be generated continuously. When a wheel passes through the measuring range so that a reflection occurs within the sensing zones 27 of the two cameras 19 and 20, a measurement is triggered, for example, by a switch in the rolling surface 14 activated by the wheel 11. The laser beams 15 and 16 produce point type reflecting markers 1 and 2 simultaneously on the tread 3 of the wheel 11. As soon as the reflecting areas pass through the sensing zones 27, the pixel plate of each sensor or camera 19, 20 produces a respective signal which is stored in the memory of the unit 22. The value measured as an analog value may first be passed through an analog-to-digital converter so that digital signals are stored for the processing. As mentioned, the angles α and β and the location of the lasers 17 and 18 as well as of the sensors 19 and 20 are known, and thus, the chord height 4, 4' can be calculated. Similarly, the length of the chord line between the points 1 and 2 can be calculated as explained below.

When the wheel has a completely circular tread surface, the chord line 5 will extend in parallel to the rolling surface 14. However, if there should be deviations from the circular shape in the tread 3, the chord line 5 will enclose an acute angle 21 as shown in FIG. 1 with the rolling surface 14. The acute angle 21 is a direct measure of the deviation of the actual tread surface 3 from a circle. By using the angle 21, it is possible to calculate the degree or extent to which the actual tread deviates from the circle. This deviation is then taken into account when calculating the chord height 4. It is also possible to calculate the chord height 4' by using the wheel rail contact point 10 and to then calculate the chord length 5'. In both instances the chord length and the chord height permit to precisely calculate the wheel diameter in the unit 22 which then displays the results in the display device 23. The respective output may also be used for controlling a truing machine.

If, for any reason, the sensing should have taken place not exactly in the measuring plane 7, it is possible to employ a profile measuring device 24 for ascertaining a profile line 13. The computer then intersects the profile line 13 with the measuring plane 7, whereby it becomes possible that any sensed point 1 and/or 2 can be calculated exactly back into the measuring plane 7. Any lateral displacements of the wheel 11 on the rail 12 out of the measuring plane 7 thus cannot falsify the measuring and calculating results.

For avoiding an angular position of the chord line 5 relative to the rolling surface 14 it is also possible to permit the points 1 and 2 sensed by the sensors or cameras 19, 20 in the zone 27, to travel and to continuously interrogate the respective values on the pixel plate of the cameras 19 and 20 and to compare the respective values until the value from the point 1 is equal to the value from the point 2. The calculation is then performed when these two values are equal to each other. For this purpose it is necessary to continuously interrogate and compare the respective values which is advantageously performed by a unit separate from the central processing unit 22. A signal signifying that the two values are equal to each other would then activate the unit 22 for a read-out.

Figure 6:
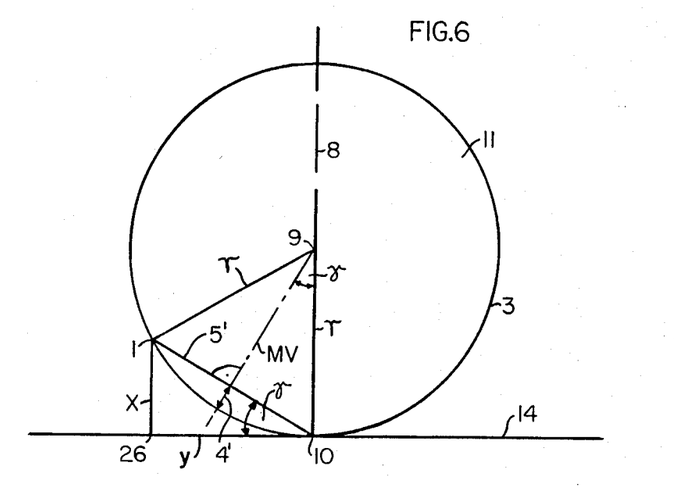
FIG. 6 illustrates the data or values that are taken into account in calculating the wheel diameter according to the invention.

Referring to FIGS. 1 and 6, it is possible to make the present calculation by sensing only point 1 and the wheel rail contact point 10 and to provide the vertical spacing "x" of the point 1 from the rolling surface 14 and the horizontal spacing "y" of point 1 from point 10.

It is necessary that the points 1 and 10 are sensed simultaneously to avoid errors caused by positional changes. Points 1 and 10 alone do not yet define the circle. However, since point 10 is the contact point between the tread 3 and the rolling surface 14, it is known that a chord 5' passing through points 1 and 10 is the base for an isosceles triangle, the sides of which are equal to the radius "r" of the circle, the diameter 6 of which is to be determined. Further, since the dimensions "x" and "y" are ascertainable, it is also possible to calculate the angle γ. Further, since the triangle is an isosceles triangle with the sides "r" and since the chord line 5' through the points 1 and 10 is the base of the triangle, the mid vertical MV must divide the opposite angle in half. Further, the tip of the triangle must be the center of the circle in question due to the condition that point 10 is the wheel rail surface contact. As a result, the radius "r" can be calculated by a sine function. Accordingly, the diameter 6 can also be calculated.

Figure 7:
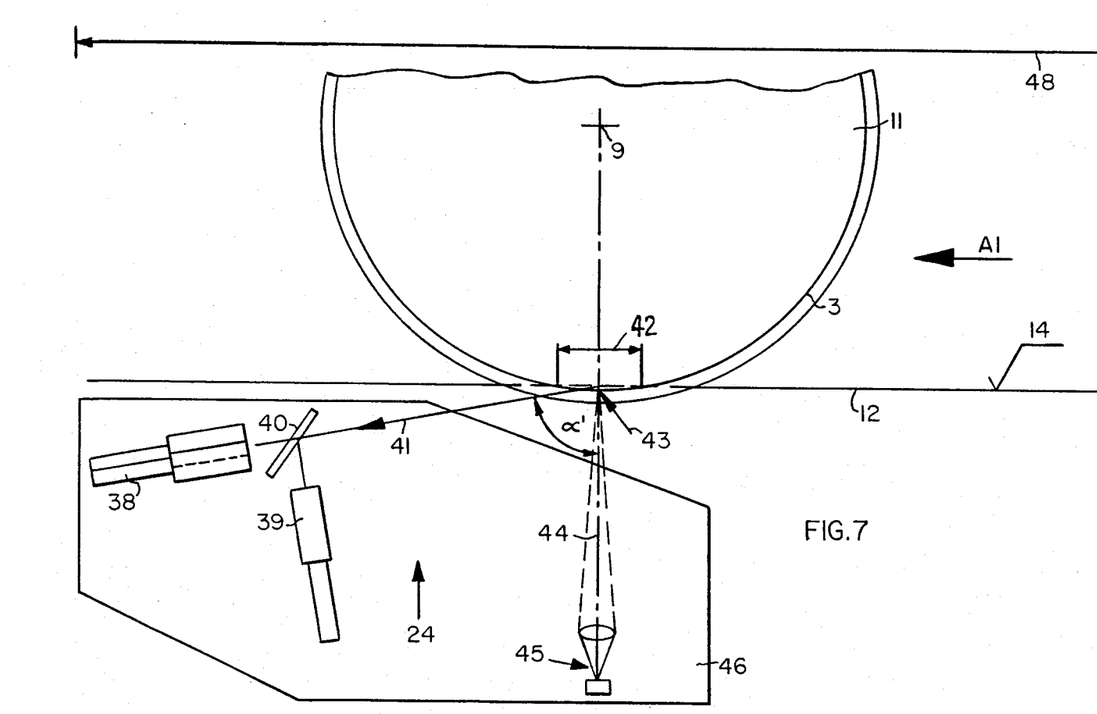
FIG. 7 illustrates a wheel profile ascertaining apparatus

FIG. 7 illustrates schematically a profile measuring device 24. The wheel 11 can travel through the measuring range 48 of given length. The travel direction is from right to left as indicated by the arrow A1. A mounting plate 46 is located below the rail 12 forming the rolling surface 14. Two CCD-cameras 38, 39 are mounted on the mounting plate 46. The cameras may form two separate structural units, whereby each unit may, in fact, comprise more than one camera. The sensing directions of these cameras or camera units are directed at right angles to each other. The cameras are located to the left of a measuring point 43. Each camera comprises an imaging optical device and a sensor plate of charge coupled devices forming a digitizing means.

An illuminating device 44 is located vertically below the measuring point or location 43. The illuminating device 44 is capable of producing on the tread surface 3 of the wheel 11 a light section or a light edge. Such illuminating sources are well known in the art.

The cameras 38 and 39 are located sufficiently below the rail 12 so as to not interfere with the rolling of the wheel. However, the arrangement is such that the cameras can receive the reflected light 41 and so that a semipermeable mirror 40 may pass some of the light to the camera 38 and deflect another light portion onto the camera 39. The reflecting direction 41 and the main direction of the light beam 44 enclose an angle α'. A slight distortion of the wheel profile that may result from this location of the cameras is correctable. The evaluation of the signals from the cameras 38 and 39 is performed by the unit 22 as shown in FIG. 1 or a separate microprocessor may be provided for this purpose. The above mentioned distortion can be eliminated by a respective calculation. It is important that the light beam 44 illuminating the wheel profile is directed radially onto the wheel within the zone 42 so that the reflected beam 41 will impinge upon the cameras 38, 39 to receive a useful image. Further, the light beam 44 must be able to reach the wheel surface or tread 3. For this purpose the rail 12 is provided with apertures and the wheel may be supported by lateral auxiliary rails 28 as shown in FIG. 2. The relevant portion of the tread surface must at least receive sufficient light in the zone 42 for the profile determination.

Although the present apparatus and system are rather simple, it permits the precise calculation of the wheel diameter without am actual physical contact. The components of the present system as such are conventional.

Figure 8:
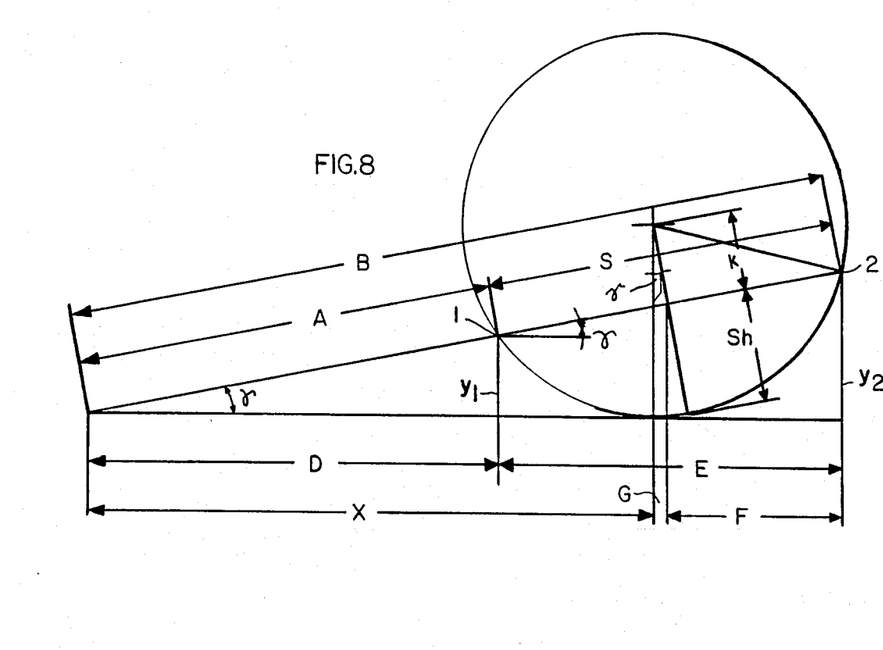
FIG. 8 shows geometric relationships involved in the present calculations.

The geometric relationships and program steps as mentioned above, will now be set forth with reference to FIGS. 1 and 8.

I. wheel diameter $6 = 2R = 2(K + Sh)$ (1.) $R = \sqrt{K^2 + \frac{S^2}{4}}$ ; (2.) $Sh$ = chord height (4)

(3.) $K = R - Sh$ (2.) $S = \frac{E}{\cos \gamma}$ (3.1) if $y_1 = y_2 = y$ then $y = Sh$ (5.) $E = C - \frac{a + y_1}{tg\,\beta} + \frac{a + y_2}{tg\,\alpha}$ (angle α, β as well as distance C, a see FIG. 1)

(6.) $tg\,\gamma = \frac{y_2 - y_1}{E}$ (7.) $X = \sqrt{A \cdot B}$ (8.) $A = \frac{y_1}{\sin \gamma}$ ; (9.) $B = \frac{y_2}{\sin \gamma}$ (10.) $K = \frac{G}{\sin \gamma}$ (11.) $G = D + E - (X + F)$ (12.) $D = \frac{y_1}{tg\,\gamma}$ ; (13.) $E$ = see (5.)

(14.) $X$ = see (7.)

(15.) $F = \frac{E}{2}$ (16.) $S = \frac{E}{\cos \gamma}$

INPUT $a, y_1, y_2, \beta, \alpha, C$ $$E = C - \left[ \frac{a + y_1}{tg\,\beta} + \frac{a + y_2}{tg\,\alpha} \right]$$

$$Z = \frac{y_2 - y_1}{E}$$

PRINT $ATNZ$ $$S = \frac{E}{\cos Z}$$

$$A = \frac{y_1}{\sin Z}$$

$$D = \frac{y_1}{tg\,Z}$$

$$B = \frac{y_2}{\sin Z}$$

$$X = \sqrt{A \cdot B}$$

$$F = \frac{E}{2}$$

$$G = D + E - (X + F)$$

$$K = \frac{G}{\sin Z}$$

$$R = \sqrt{K^2 + \frac{S^2}{4}}$$

-continued
PRINT R

What we claim is:
1. A method for determining the diameter of a rail vehicle wheel having a circumferential tread surface and a rotational axis, comprising the following steps:
   (a) positioning said rail vehicle wheel upon a defined running surface,
   (b) simultaneously sensing at least first and second random points interconnected by a chord and circumferentially spaced from each other on said tread surface for determining the position of said first and second random points,
   (c) ascertaining the height of each of said first and second random points above said defined running surface,
   (d) and calculating from said positions including the respective heights of said two points, said diameter of said rail vehicle wheel.

2. The method of claim 1, wherein said step of simultaneously sensing is so performed that one of said first and second random points coincides with a rail wheel point of contact (10).

3. The method of claim 1, further comprising measuring, prior to said step of simultaneously sensing, the actual profile of said tread surface to determine at least one profile line (13), locating a measuring plane through said wheel perpendicularly to said rotational axis, intersecting said profile line with said measuring plane to provide an intersection and then preforming said step of simultaneously sensing at said intersection section and at a further position also located on said measuring plane.

4. The method of claim 1, further comprising determining, prior to said step of simultaneously sensing, a measuring plane (7) substantially centrally through said wheel perpendicularly to a rotational axis (9) of said wheel, and locating said first and second points in said measuring plane.

5. The method of claim 4, further comprising determining, prior to said step of simultaneously sensing, an axial plane (8) extending in said wheel rotational axis (9) and through a rail wheel point of contact between said tread surface and said defined running surface, and locating said first and second random points on opposite sides of said axial plane and in said measuring plane.

6. The method of claim 1, further comprising determining, prior to said step of simultaneously sensing, an axial plane (8) extending in said wheel rotational axis (9) and a rail wheel point of contact between said tread surface and said defined running surface, and also locating at least one of said first and second random points on one side of said axial plane prior to said simultaneously sensing said first and second random points.

7. The method of claim 6, wherein said step of simultaneously sensing is so performed that additional points forming a pair of points on said tread surface are simultaneously sensed, said additional points being sensed separately from any sensing of other point pairs and performing said calculating step by repeatedly calculating the wheel diameter with the aid of said additional points independently of any other wheel diameter calculation.

8. The method of claim 6, wherein said step of simultaneously sensing is performed so as to locate all sensed points (1, 1'; 2, 10) in a common measuring plane (7) extending perpendicularly through said rotational axis and centrally through said wheel.

9. The method of claim 1, wherein said step of simultaneously sensing is performed by:
   (a) rolling said wheel along a running plane (14) through a measuring distance having a defined length (C),
   (b) locating at least two electromagnetic radiation sources (17, 18) relative to said running plane (14) so that respective radiation beams (15, 16) extend at given angles ($\alpha, \beta$) relative to said running plane (14),
   (c) directing said radiation beams (15, 16) onto said tread surface of said wheel in a sensing plane (7) extending perpendicularly to said rotational wheel axis (9), for producing point type reflection areas (1, 2) on said tread surface,
   (d) determining a location (c, a) of said radiation sources relative to each other and relative to said running plane (14), and
   (e) sensing the location of said point type reflection areas by means of said sensors (19, 20) for said electromagnetic radiation, and wherein said step of ascertaining said height of said first and second random points involves measuring a slant (21) of said chord relative to said running plane (14), and performing said calculating step on the basis of data obtained in steps d, e, and on the basis of said slant.

10. The method of claim 9, wherein said wheel is kept moving when said sensing is performed.

11. The method of claim 9, further comprising generating said radiation beams by means of laser generators.

12. The method of claim 9, wherein said step of simultaneously least once in a position of said wheel which position differs from a preceding wheel position in which a preceding sensing was performed.

13. An apparatus for determining the diameter of a rail vehicle wheel having a circumferential tread surface and a rotational axis, comprising rail means positioned for defining a running surface (14) for said wheel (11), said running surface defining a measuring range of given length, means for generating at least two sensible point type markers (1, 1', 2) on said tread surface, at least two markers to produce marker signals, central processing computer means connected to said generating means and to said sensor means for calculating diameter values from data received as said marker signals from said sensing means and from height values of said first and second random points calculated by said computer means, said generating means having tow generators located at a defined spacing from each other and from said running surface in said measuring range so that said sensible point type markers can be set and also sensed within said measuring range.

14. The apparatus of claim 13, wherein said generating means comprise laser generators for generating laser beams and directing said laser beams (15, 16) onto said tread surface.

15. The apparatus of claim 13, wherein said sensor means comprise charge coupled devices forming a sensor camera.

16. The apparatus of claim 13, further comprising wheel profile measuring means (24) for ascertaining an actual profile of said wheel, said wheel profile measuring means (24) being connected to said central processing computer means.

17. The apparatus of claim 16, wherein said wheel profile measuring means comprise signal evaluating means connected to said central processing computer means.

18. The apparatus of claim 13, wherein said generator means comprise two beam generators located for directing respective beams vertically upwardly onto said tread surface, said two beam generators and thus said beams having a fixed spacing (25) from each other in a measuring plane (7), said fixed spacing being smaller than the smallest wheel diameter of wheels the diameter of which is to be measured.

19. The apparatus of claim 13, wherein said generator means comprise two beam generators located for directing beams at said tread surface at a given angle ($\alpha,\beta$) to said running surface (14), said two beam generators having a fixed spacing (C) from each other in a measuring plane (7).

* * * * *

UNITED STATES PATENT AND TRADEMARK OFFICE
CERTIFICATE OF CORRECTION

PATENT NO. : 4,866,642

DATED : September 12, 1989

INVENTOR(S) : Hans W. Obrig, Helmut Wittkopp, Nis-Friedrich Ewald

It is certified that error appears in the above-identified patent and that said Letters Patent is hereby corrected as shown below:

Claim 3, (column 11) line 7 of Claim 3, replace "preforming" by --performing--.

Claim 4, (column 11) line 5 of claim 4, before "points" insert --random--.

Claim 12, (column 12) line 2 of claim 12, after "taneously" insert --sensing is repeated at--.

Claim 13, (column 12) line 8 of claim 13, after "two" insert --sensor means arranged for the simultaneous sensing of said sensible--;
line 14 of claim 13, replace "tow" by --two--.

Signed and Sealed this

Twenty-fourth Day of July, 1990

Attest:

HARRY F. MANBECK, JR.

Attesting Officer

Commissioner of Patents and Trademarks